D. BOYLE.
Ice-Machine.

No. 163,142. Patented May 11, 1875.

Witnesses:
J. P. Theodore Lang
Chas. O. Gill

Inventor:
David Boyle
by his Attys.
Cox & Cox

THE GRAPHIC CO. PHOTO-LITH. 39 & 41 PARK PLACE, N.Y.

UNITED STATES PATENT OFFICE.

DAVID BOYLE, OF WASHINGTON, DISTRICT OF COLUMBIA.

IMPROVEMENT IN ICE-MACHINES.

Specification forming part of Letters Patent No. 163,142, dated May 11, 1875; application filed November 10, 1874.

*To all whom it may concern:*

Be it known that I, DAVID BOYLE, of Washington, District of Columbia, have invented certain new and useful Improvements in Ice and Refrigerating Machines, of which the following is a specification, reference being had to the accompanying drawings.

The invention relates to an improved ice-machine; and consists in producing a current of the freezing agent around an evaporator-coil placed in a hollow compartment, for the purpose of chilling the freezing agent evenly and speedily; also, in agitating the water in the tank between the freezing-surfaces, so as to assist in the congelation and expel the confined air, thereby producing clear ice.

Figure 1:
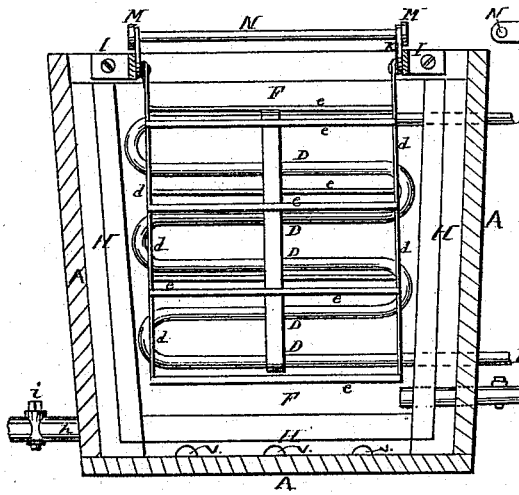
Figure 2:
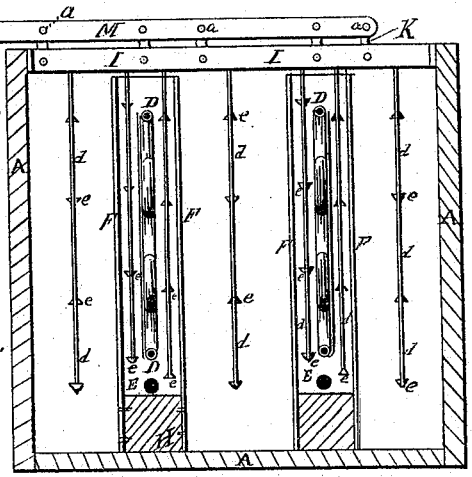
Figure 3:
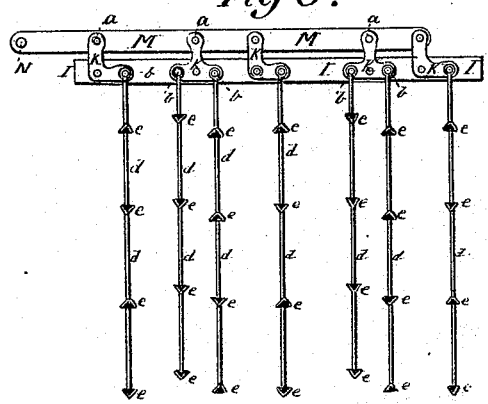

Figure 1 is a side elevation of a device embodying the elements of the invention, one side of the tank and one of the plates F removed. Fig. 2 is an end view of same, one side of the tank A and one end of the frame H removed.

A, in the accompanying drawings, is a freezing-tank of any suitable construction. D are coils placed vertically in the compartments E, which are constructed in any proper manner, having the plates F, of conducting material, secured to the frame H, of non-conducting material, and recessed, as shown at *v*. The agitator consists of the strips I, which extend transversely across the top of the tank A, and are provided at certain intervals with the rocking plates K, pivoted to the strips about their centers. Their upper ends, extending above the strip, are provided with the aperture *a*. At each lateral end of the rocking plates the apertures *b* are placed, in which are loosely secured the upper ends of the pendants *d*, which are placed opposite each other, and at opposite sides of the tank, certain pairs being in the compartments E, on each side of the coil, the other pairs being in the tank between the freezing-surfaces, and also between the said surfaces and the sides of the tank. The pendants *d* are connected in pairs by the hollow conical or angular strips *e*, which extend from one pendant to that opposite on the other side of the tank or compartment. Upon the pendants in the compartments E are placed, on each side of the coil, the strips *e*, with their apexes upward, and on those pendants on the other side of the coil the strips *e* have their apexes downward, the object of this arrangement being to produce a current of the freezing agent around the coil D, thus bringing the fluid in contact therewith, and also in contact with the interior of the freezing-surfaces. Upon the pendants *d*, between the freezing-plates, and between the plates and the side of the tank, the strips *e* are placed alternately, with their apexes upward and downward, the object of this construction being to agitate the water, so as to produce a uniform temperature, and also to assist the congelation, as water at rest may be several degrees below the freezing-point and yet not freeze. The agitation also assists in expelling confined air.

Rods M connect the upper ends of the rocking plates K, and extend beyond the side of the tank, where they are provided with a cross rod, N, which being moved, all the pendants D and attachments are alternately elevated and lowered, creating a current in the compartments, and agitating the water in the tank.

The operation is conducted by filling the tank A to about the level of the upper edges of the plates F, filling the compartments E with the refrigerant, then admitting the chilling agent to the coils D. The agitating and current-creating devices are now operated with the effect aforesaid, until ice of the desired thickness is formed in sheets upon the plates F.

Care should be taken that the ice does not form entirely across the water-spaces.

The usual product is ice free from bubble or any other imperfection.

I do not lay any claim herein to the compartment E, provided with the coil D and suitable filling and emptying vents, as I have made that the subject-matter of another and separate application for patent; but What I do claim as my invention, and desire to secure by Letters Patent, is—

1. A device common to the compartments and spaces between them, whereby the uncongealable fluid in the compartments and the water in the spaces between the compartments are operated upon, producing simultaneously current around the evaporator-coil in the compartment, and agitating the water between the freezing-plates, substantially as specified.

2. The pyramidal strips $e$, for agitating the water and creating a current in the uncongealable fluid, as set forth.

3. An evaporator-tank surrounded by a nonconductor, in combination with the strips $e$, draw-rods $d$, and means of operating the rods, substantially as stated.

In testimony that I claim the foregoing improvements in ice and refrigerating machines, as above described, I have hereunto set my hand and seal this 3d day of November, 1874.

DAVID BOYLE. [L. S.]

Witnesses:
WILLIAM B. BUSHNELL,
THOS. L. RANKIN.